US010517263B1

(12) United States Patent
Perez

(10) Patent No.: US 10,517,263 B1
(45) Date of Patent: Dec. 31, 2019

(54) COMBINATION PET CARRIER AND LITTER BOX KIT

(71) Applicant: Jose L. Perez, Jackson Heights, NY (US)

(72) Inventor: Jose L. Perez, Jackson Heights, NY (US)

( * ) Notice: Subject to any disclaimer, the term of this patent is extended or adjusted under 35 U.S.C. 154(b) by 918 days.

(21) Appl. No.: 15/065,613

(22) Filed: Mar. 9, 2016

(51) Int. Cl.
| | |
|---|---|
| *A01K 1/035* | (2006.01) |
| *A01K 1/01* | (2006.01) |
| *A01K 1/00* | (2006.01) |
| *A01K 1/02* | (2006.01) |
| *A01K 1/015* | (2006.01) |

(52) U.S. Cl.
CPC ............ *A01K 1/0035* (2013.01); *A01K 1/011* (2013.01); *A01K 1/0107* (2013.01); *A01K 1/0128* (2013.01); *A01K 1/0157* (2013.01); *A01K 1/0245* (2013.01)

(58) Field of Classification Search
CPC .. A01K 1/0245; A01K 1/0107; A01K 1/0236; A01K 1/033; A01K 1/03; A01K 31/04; A01K 31/06; A01K 1/011; A01K 1/034; A01K 1/035
USPC ....... 119/497, 479, 165, 453, 496, 499, 170, 119/454, 463, 473, 474, 482, 501
See application file for complete search history.

(56) References Cited

U.S. PATENT DOCUMENTS

| | | | | |
|---|---|---|---|---|
| 4,171,683 A | * | 10/1979 | Godin | A01K 1/035 119/482 |
| 4,299,190 A | * | 11/1981 | Rhodes | A01K 1/0107 119/170 |
| 4,572,107 A | * | 2/1986 | Clarizo | A01K 31/04 119/463 |
| 4,803,952 A | * | 2/1989 | Houser | A01K 1/033 119/499 |
| 4,852,520 A | | 8/1989 | Goetz | |
| 5,253,612 A | | 10/1993 | Goetz | |
| 5,471,950 A | * | 12/1995 | White | A01K 1/0107 119/165 |
| 5,503,107 A | * | 4/1996 | Satcher | A01K 1/0236 119/496 |
| 5,622,140 A | | 4/1997 | McIlnay-Moe | |
| 5,678,509 A | * | 10/1997 | Dillon | A01K 1/0107 119/165 |
| 5,988,110 A | * | 11/1999 | Peterson | A01K 1/03 119/453 |
| 6,131,534 A | * | 10/2000 | Axelrod | A01K 1/0245 119/497 |
| 6,338,318 B1 | * | 1/2002 | Apichom | A01K 1/0107 119/453 |
| 7,036,458 B1 | | 5/2006 | Stornant | |
| 7,458,337 B2 | | 12/2008 | Callan | |
| D608,505 S | * | 1/2010 | Lin | D30/109 |
| 8,132,537 B2 | * | 3/2012 | Trunnell | A01K 1/0245 119/496 |
| 8,336,500 B1 | * | 12/2012 | Britt | 119/472 |
| D677,012 S | | 2/2013 | Duvigneau | |
| 9,504,230 B1 | * | 11/2016 | Schillero, Jr. | A01K 1/0236 |

(Continued)

*Primary Examiner* — Yvonne R Abbott-Lewis
(74) *Attorney, Agent, or Firm* — Peter A. Hurley; Richard L. Miller

(57) ABSTRACT

A multi-function carrier carries a pet and holds litter. The multi-function carrier includes a primary enclosure and a waste collection assembly. The primary enclosure carries the pet. The waste collection assembly is operatively connected to the primary enclosure and holds the litter.

104 Claims, 10 Drawing Sheets

(56) References Cited

U.S. PATENT DOCUMENTS

| | | | |
|---|---|---|---|
| 9,713,315 B2* | 7/2017 | Sweetman | A01K 1/0107 |
| 2006/0005777 A1* | 1/2006 | Galindo | A01K 1/0107 |
| | | | 119/165 |
| 2009/0205578 A1 | 8/2009 | Alves | |
| 2010/0282179 A1* | 11/2010 | Ho | A01K 1/03 |
| | | | 119/455 |
| 2014/0318469 A1* | 10/2014 | Beasley | A01K 1/0245 |
| | | | 119/497 |
| 2016/0057968 A1* | 3/2016 | Chandler | A01K 1/0272 |
| | | | 119/497 |

* cited by examiner

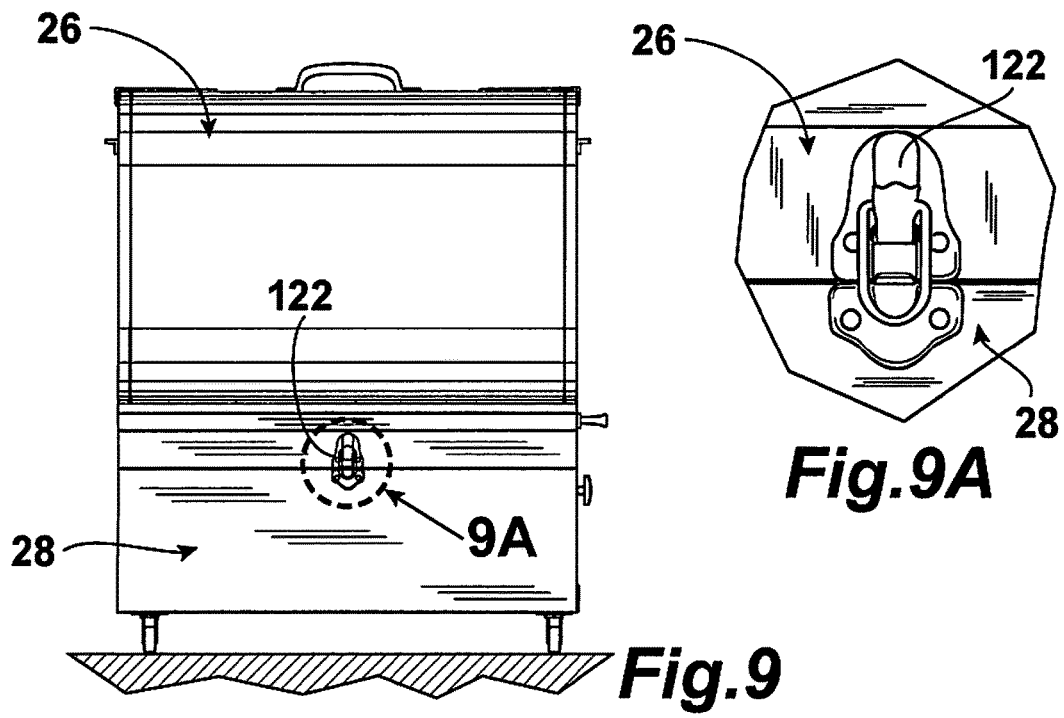
Fig.9
Fig.9A
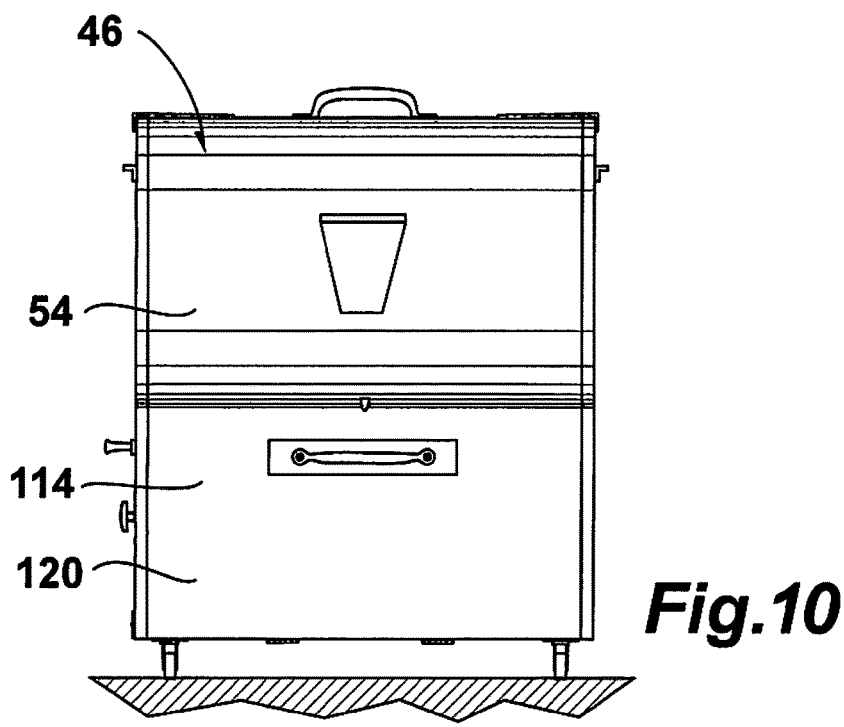
Fig.10

COMBINATION PET CARRIER AND LITTER BOX KIT

BACKGROUND OF THE INVENTION

Field of the Invention

The present invention relates to a pet carrier, and more particularly, a combination pet carrier and litter box kit.

Description of the Prior Art

Numerous innovations for pet carriers have been provided in the prior art that will be described. Even though these innovations may be suitable for the specific individual purposes to which they address, however, they differ from the present invention.

A FIRST EXAMPLE, U.S. Pat. No. 4,852,520, Issued on Aug. 1, 1989, to Goetz teaches a portable pet carrier having a lower section and a removable upper section attached thereto. The lower section has a bottom wall, spaced side walls, a rear wall, and a front wall with an access opening. The upper section has a top wall, spaced side walls, a rear wall, and a front wall with an access opening. The upper section and the lower section are attached by clips that extend through aligned openings in horizontal lips extending outwardly from the edges of the walls of both sections. A gate is pivotally mounted in the access openings in the front walls of the upper section and the lower section, and a latch is located on the gate for retaining the gate in the closed position. A plurality of rollers are carried on the exterior of the bottom wall of the lower section, and lifting and towing handles are pivotally attached to the exterior of the top wall of the upper section for moving the portable pet carrier.

A SECOND EXAMPLE, U.S. Pat. No. 5,253,612, Issued on Oct. 19, 1993, to Goetz teaches a pet carrier having ventilated sidewalls and four supports at the corners of the bottom of the carrier. Each support contains a roller that is selectively retractable into the support or projected outwardly to enable the carrier to be pulled by a pull cord. Four corresponding receptacles are secured to the corners of the top of the pet carrier of slightly greater dimension than said supports so as to snugly receive the supports when like carriers are in stacked position.

A THIRD EXAMPLE, U.S. Pat. No. 5,471,950, Issued on Dec. 5, 1995, to White teaches an animal litter container that is constructed so that it may be attached to a conventional animal carrier. The litter box has an opening in its front wall that meets an opening cut or manufactured into the rear wall of an animal carrier. Access is therefore provided for movement between the litter box and the carrier. A method is provided for attaching the litter box securely to the carrier. A latch is provided to secure the opening in the rear carrier wall when the litter box is detached from the carrier, so that the escape-proof integrity of the animal carrier is completely restorable for times when it is to be used alone. A seal is provided to contain the litter box's contents and odors when the litter box is not in active use.

A FOURTH EXAMPLE, U.S. Pat. No. 5,503,107, Issued on Apr. 2, 1996, to Satcher, et al. teaches a container for manually transporting a pet having a litter box, food container and water container therein, and sliding doors accessible from the exterior of the container for selectively closing the litter box, food container, and water container to prevent inadvertent spillage. The container may include a single compartment or two detachably connected compartments in order that a litter box compartment may be selectively separated from a food and water compartment. Detachable handles are provided in order that each separate compartment of the dual compartment embodiment may be carried separately or as a unified compartment.

A FIFTH EXAMPLE, U.S. Pat. No. 5,622,140, Issued on Apr. 22, 1997, to McIlnay-Moe teaches a pet litter box apparatus including an outer enclosure having a front opening for access by a cat or other animal, with an inner carrier providing a litter accumulation area and including a radially-extending screen rotationally mounted within the outer enclosure on a carrier support at a hub. A waste storage container with a normally closed access port is positioned below the hub. For cleaning, the carrier is rotated about the hub on its axis of rotation to move the screen through the litter accumulation area to collect any agglomerated litter and fecal material. This waste is carried by the screen in the rotating carrier to a point above the hub where a shield on the hub normally covering the access port for the waste storage container has now rotated to expose the access port and enable the agglomerated litter and fecal material to fall into the waste storage container.

A SIXTH EXAMPLE, U.S. Pat. No. 5,678,509, Issued on Oct. 21, 1997, to Dillon teaches a box having a rectangular base with short upstanding front and rear walls and long upstanding side walls therebetween with an open top. The box also has a small rectangular opening in the front wall for the passage of a cat therethrough. A rectangular tray is positioned over the opened upper edge of the box. The tray has short front and rear walls with long side walls therebetween. A divider box is positioned parallel with, and centrally located between, the front and rear edges of the tray with a handle formed therethrough. The divider bar separates the tray into an eating area and a sleeping area. Removable coupling elements are located between the box and the lid. The coupling elements include apertures formed in the side walls of the box adjacent to the upper edges thereof. Clips are secured to the side walls of the tray adjacent to the lower edges thereof.

A SEVENTH EXAMPLE, U.S. Pat. No. 7,036,458, Issued on May 2, 2006, to Stornant teaches a housing has a front wall and a door, a rear wall, a pair of side walls each with a window, a bottom wall with a bottom recess with a lower hinged door, a top wall with a top aperture with an upper hinged door with a plurality of ventilation apertures, a water bottle, and a food receptacle. The housing receives animal litter on the bottom wall. Wheels are coupled to the bottom wall. A removable transportation rod is snap coupled with pivoting capabilities.

AN EIGHTH EXAMPLE, U.S. Pat. No. 7,458,337, Issued on Dec. 2, 2008, to Callan teaches a portable cat litter box including a lower portion having a pair of wheels mounted thereon, an upper portion that is attachable to the lower portion in order to collectively define an interior compartment for containing kitty litter, a door pivotally suspended in order to allow ingress and egress of a cat into the interior compartment, and an extension handle pivotally attached to the cat litter box to facilitate transportation thereof and which is lockable to the upper portion during non-use.

A NINTH EXAMPLE, U.S. Pat. No. D677,012, Issued on Feb. 26, 2013, to Duvigneau teaches the ornamental design for a combined animal carrier and litter box.

A TENTH EXAMPLE, U.S. Patent Office Document No. 2009/0205578, Published on Aug. 20, 2009, to Alves teaches a wheeled pet carrier that also contains a detachable litter box. The pet carrier also optionally has a retractable shoulder strap and a retractable handle. The retractable handle can be used to pull the wheeled pet carrier. The litter box portion also optionally has a deodorizer.

It is apparent now that numerous innovations for pet carriers have been provided in the prior art that adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide a combination pet carrier and litter box kit that avoids the disadvantages of the prior art.

ANOTHER OBJECT of the present invention is to provide a combination pet carrier and litter box kit that is simple and inexpensive to manufacture.

STILL ANOTHER OBJECT of the present invention is to provide a combination pet carrier and litter box kit that is simple to use.

BRIEFLY STATED, STILL YET ANOTHER OBJECT of the present invention is to provide a multi-function carrier that carries a pet and holds litter. The multi-function carrier includes a primary enclosure and a waste collection assembly. The primary enclosure carries the pet. The waste collection assembly is operatively connected to the primary enclosure and holds the litter.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows:

FIG. 9 is a right side elevational view thereof taken generally in the direction of arrow 9 in FIG. 2;

FIG. 9A is an enlarged diagrammatic side view of the area generally enclosed by the dotted curve identified by arrow 9A in FIG. 9;

FIG. 10 is a left side elevational view thereof taken generally in the direction of arrow 10 in FIG. 2;

A MARSHALING OF REFERENCE NUMERALS UTILIZED IN THE DRAWING

Introductory

Figure 1:
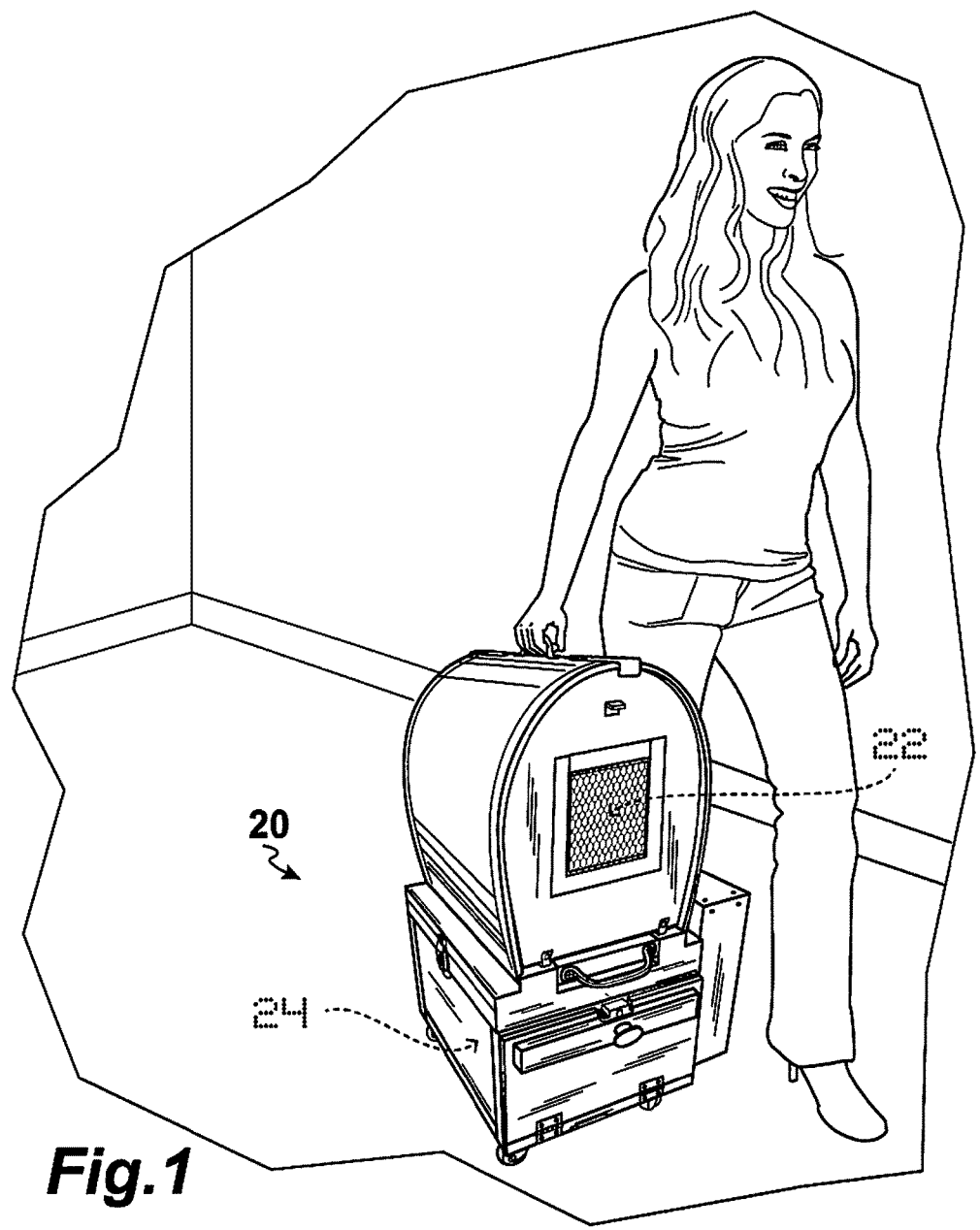
FIG. 1 is a diagrammatic perspective front view illustrating an embodiment of the combination pet carrier and litter box kit in use.
Figure 2:
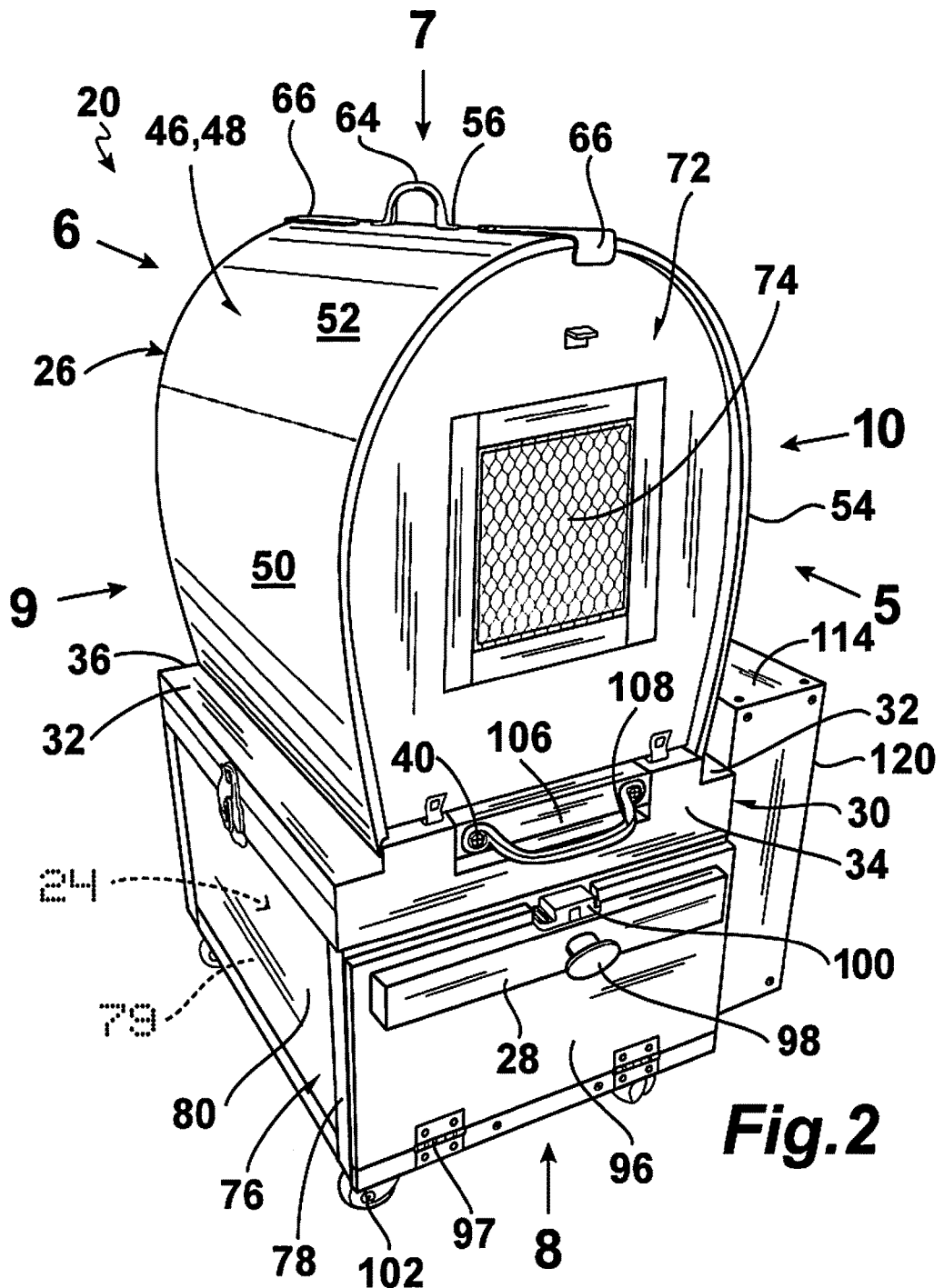
FIG. 2 is an enlarged diagrammatic perspective front view illustrating an embodiment of the combination pet carrier and litter box kit per se.
Figure 3:
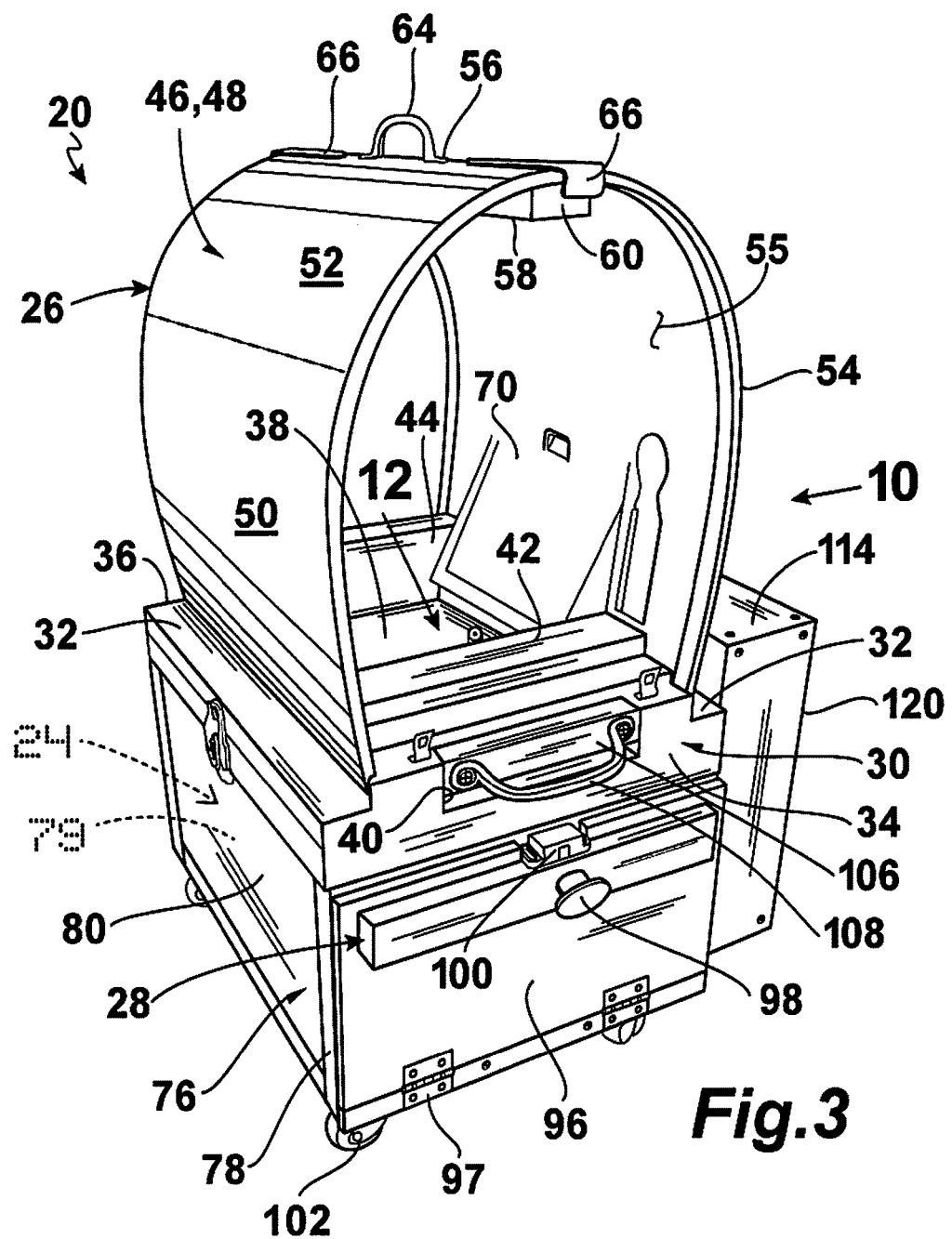
FIG. 3 is another enlarged diagrammatic perspective front view but with the doors omitted so as to permit some interior details to be seen.
Figure 4:
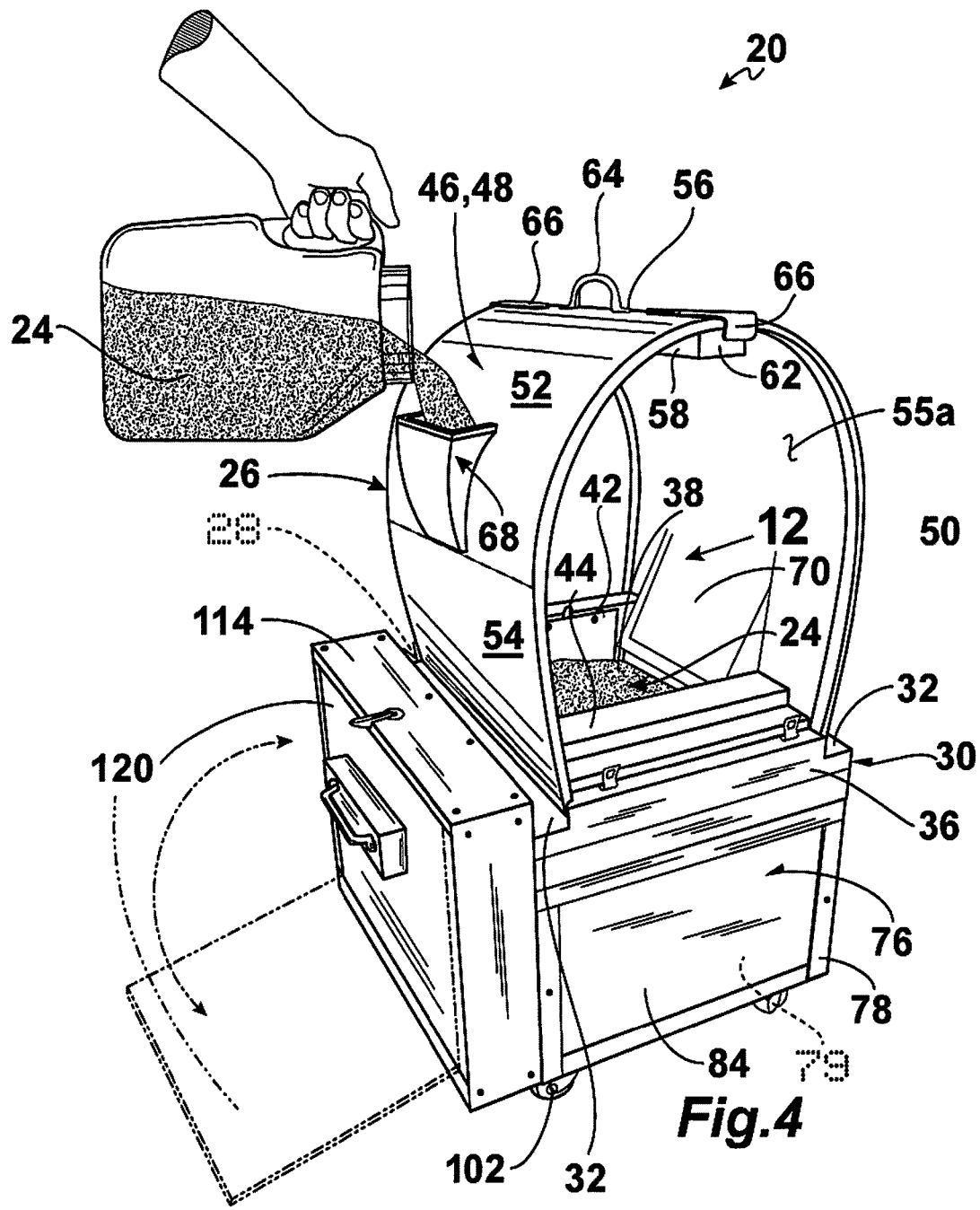
FIG. 4 is an enlarged diagrammatic perspective rear view also with the doors omitted so as to permit additional interior details to be seen.
Figure 5:
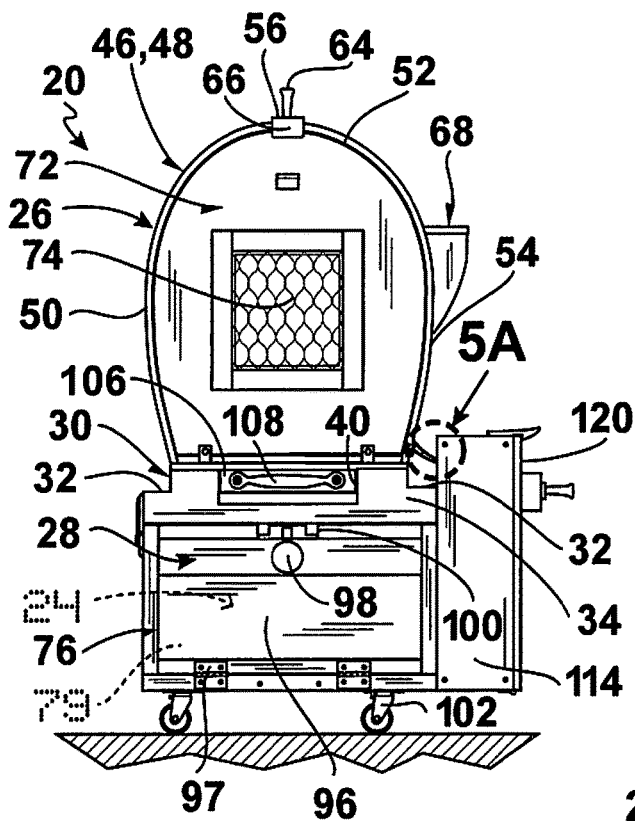
FIG. 5 is a front elevational view thereof.
Figure 5A:
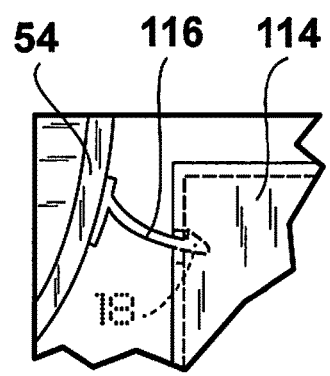
FIG. 5A is an enlarged diagrammatic front view of the area generally enclosed by the dotted curve identified by arrow 5A in FIG. 5.
Figure 6:
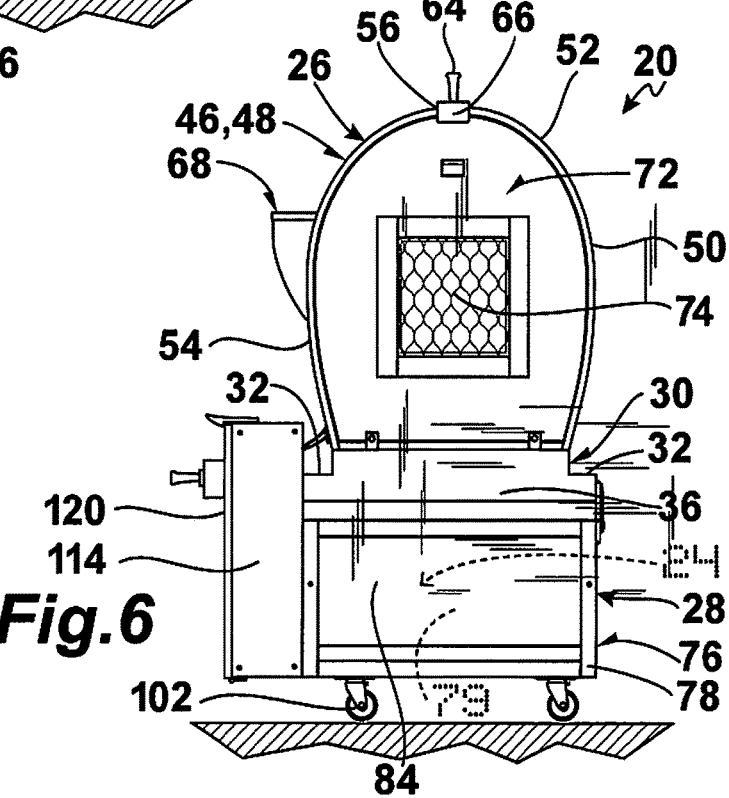
FIG. 6 is a rear elevational view thereof taken generally in the direction of arrow 6 in FIG. 2.
Figure 7:
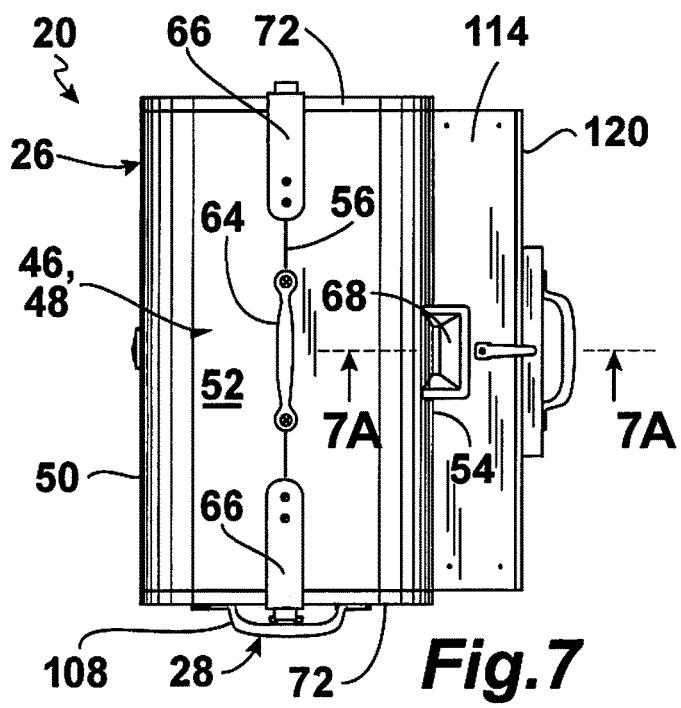
FIG. 7 is a top plan view thereof taken generally in the direction of arrow 7 in FIG. 2.
Figure 7A:
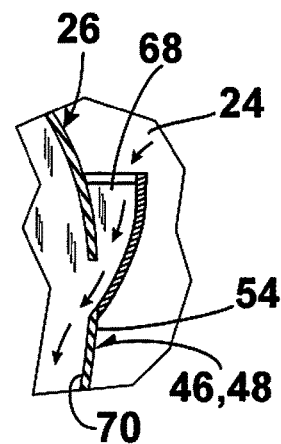
FIG. 7A is an enlarged diagrammatic cross sectional view taken along line 7A-7A in FIG. 7.
Figure 8:
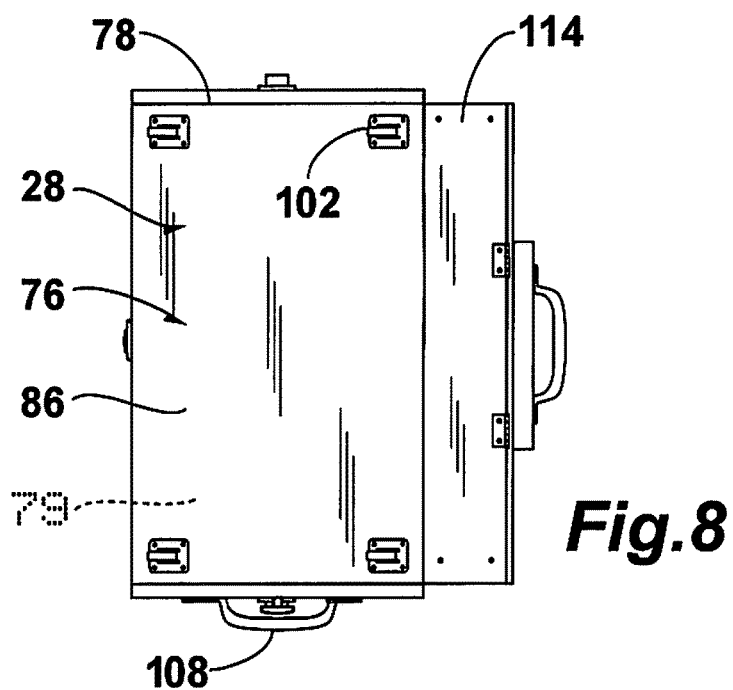
FIG. 8 is a bottom plan view thereof taken generally in the direction of arrow 8 in FIG. 2.
Figure 11:
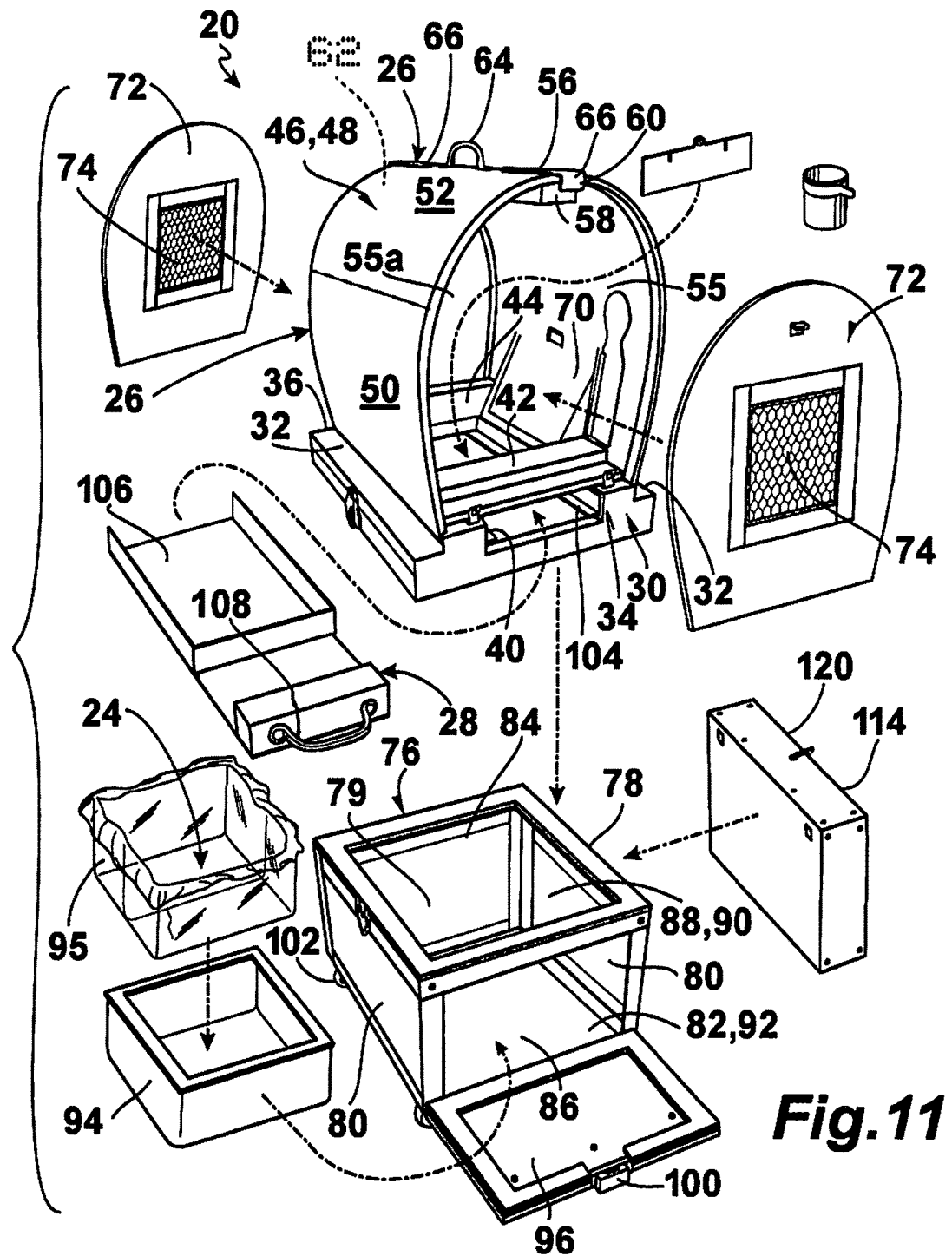
FIG. 11 is an exploded diagrammatic perspective view illustrating the cooperation among various components.
Figure 12:
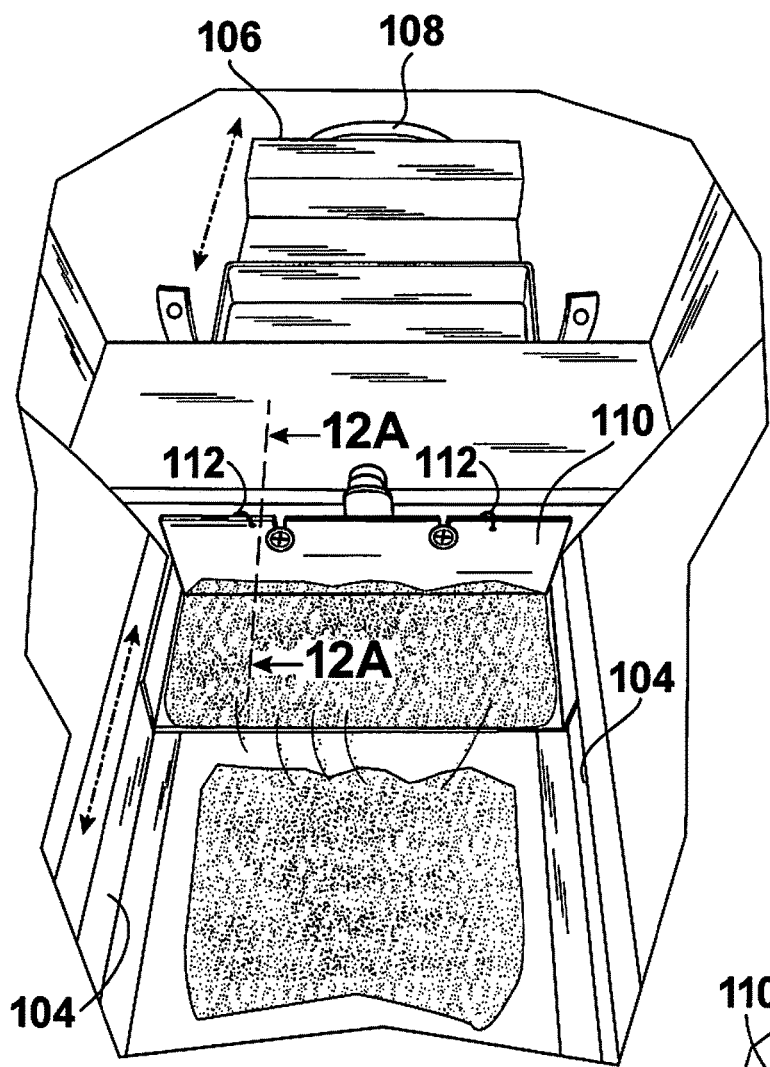
FIG. 12 is an enlarged diagrammatic top plan view taken generally in the direction of arrow 12 in FIG. 3.
Figure 12A:
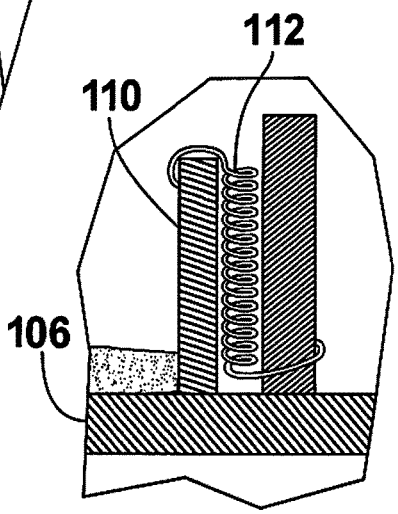
FIG. 12A is an enlarged cross sectional view taken along line 12A-12A in FIG. 12.
Figure 13:
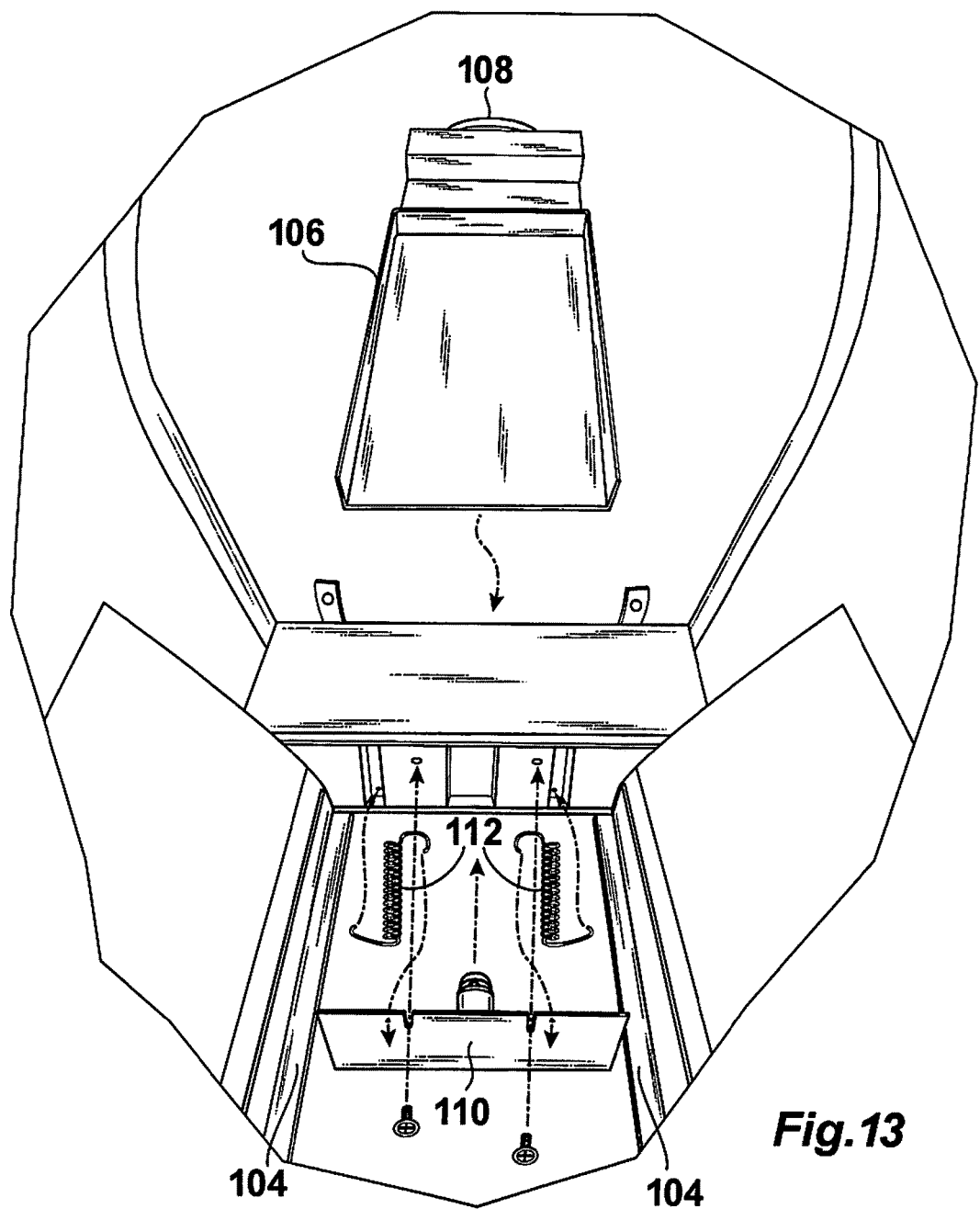
FIG. 13 is an exploded perspective view illustrating the waste capturing components.

20 multi-function carrier of embodiments of present invention for carrying pet 22 and for holding litter 24
22 pet
24 litter Overall Configuration of Multi-Function Carrier 20

26 primary enclosure for carrying pet 22
28 waste collection assembly for holding litter 24

Specific Configuration of Primary Enclosure 26

30 base of primary enclosure 26
32 pair of side walls of base 30 of primary enclosure 26
34 front wall of base 30 of primary enclosure 26
36 rear wall of base 30 of primary enclosure 26
38 through opening of base 30 of primary enclosure 26
40 through slot of front wall 34 of base 30 of primary enclosure 26
42 front cross member of base 30 of primary enclosure 26
44 rear cross member of base 30 of primary enclosure 26
46 cover of primary enclosure 26
48 piece of sheet material of cover 46 of primary enclosure 26
50 first portion of piece of sheet material 48 of cover 46 of primary enclosure 26
52 second portion of piece of sheet material 48 of cover 46 of primary enclosure 26
54 third portion of piece of sheet material 48 of cover 46 of primary enclosure 26
55 open front of piece of sheet material 48 of cover 46 of primary enclosure 26
55a open rear of piece of sheet material 48 of cover 46 of primary enclosure 26
56 high point of cover 46 of primary enclosure 26
58 spine of cover 46 of primary enclosure 26
60 front stop of spine 58 of cover 46 of primary enclosure 26
62 rear stop of spine 58 of cover 46 of primary enclosure 26
64 hand carrying handle of cover 46 of primary enclosure 26 for facilitating carrying multi-function carrier 20 by user
66 pair of springy catches of cover 46 of primary enclosure 26
68 chute of cover 46 of primary enclosure 26 for allowing litter 24 to be poured therethrough
70 pair of ramps of cover 46 of primary enclosure 26 for directing litter 24 poured through chute 68 of cover 46 of primary enclosure 26

72 pair of doors of cover 46 of primary enclosure 26
74 mesh portion of pair of doors 72 of cover 46 of primary enclosure 26, respectively, for allowing pet 22 in multi-function carrier 20 to be able to view out therefrom Specific Configuration of Waste Collection Assembly 28

76 secondary enclosure of waste collection assembly 28
78 frame of secondary enclosure 76 of waste collection assembly 28
79 chamber of frame 78 of secondary enclosure 76 of waste collection assembly 28
80 pair of side walls of frame 78 of secondary enclosure 76 of waste collection assembly 28
82 front of frame 78 of secondary enclosure 76 of waste collection assembly 28
84 rear wall of frame 78 of secondary enclosure 76 of waste collection assembly 28
86 bottom wall of frame 78 of secondary enclosure 76 of waste collection assembly 28
88 top of frame 78 of secondary enclosure 76 of waste collection assembly 28
90 through opening of top 88 of frame 78 of secondary enclosure 76 of waste collection assembly 28
92 through opening of front 82 of frame 78 of secondary enclosure 76 of waste collection assembly 28
94 receptacle of secondary enclosure 76 of waste collection assembly 28 for holding litter 24 that has been used
95 disposable liner of receptacle 94 of secondary enclosure 76 of waste collection assembly 28
96 door of secondary enclosure 76 of waste collection assembly 28
97 hinges of door 96 of secondary enclosure 76 of waste collection assembly 28
98 pull knob of door 96 of secondary enclosure 76 of waste collection assembly 28
100 magnetic latch of door 96 of secondary enclosure 76 of waste collection assembly 28
102 casters of secondary enclosure 76 of waste collection assembly 28
104 pair of tracks of waste collection assembly 28
106 tray of waste collection assembly 28 for receiving waste from pet 22
108 handle of tray 106 of waste collection assembly 28
110 scraper blade of waste collection assembly 28 for scraping waste of pet 22 off of tray 106 of waste collection assembly 28 and thereby allow waste of pet 22 to drop into receptacle 94 of secondary enclosure 76 of waste collection assembly 28 for disposal
112 pair of springs of scraper blade 110 of waste collection assembly 28
114 tertiary enclosure of waste collection assembly 28 for storing pet-related items
116 pair of resilient hooks of tertiary enclosure 114 of waste collection assembly 28
118 pair of openings of tertiary enclosure 114 of waste collection assembly 28
120 door of tertiary enclosure 114 of waste collection assembly 28

Miscellaneous 122 latch and catch lock

DETAILED DESCRIPTION OF THE PREFERRED EMBODIMENTS

Introductory

Referring now to the figures, in which like numerals indicate like parts, and particularly to FIG. 1, the multi-function carrier of the embodiments of the present invention is shown generally at 20 for carrying a pet 22 and for holding litter 24

Overall Configuration of the Multi-Function Carrier 20

The overall configuration of the multi-function carrier 20 can best be seen in FIGS. 2-7, 7A, and 11, and as such, will be discussed with reference thereto.

The multi-function carrier 20 comprises a primary enclosure 26 and a waste collection assembly 28. The primary enclosure 26 is for carrying the pet 22. The waste collection assembly 28 is operatively connected to the primary enclosure 26 and is for holding the litter 24.

Specific Configuration of the Primary Enclosure 26

The specific configuration of the primary enclosure 26 can best be seen in FIGS. 2-7, 7A, and 11, and as such, will be discussed with reference thereto.

The primary enclosure 26 includes a base 30.

The base 30 of the primary enclosure 26 is substantially square-shaped, and as such, has a pair of side walls 32, a front wall 34, and a rear wall 36.

The pair of side walls 32 of the base 30 of the primary enclosure 26, the front wall 34 of the base 30 of the primary enclosure 26, and the rear wall 36 of the base 30 of the primary enclosure 26 define therebetween a through opening 38.

The front wall 34 of the base 30 of the primary enclosure 26 has a through slot 40 therein.

The through slot 40 of the front wall 34 of the base 30 of the primary enclosure 26 communicates with the through opening 38 of the base 30 of the primary enclosure 26.

The base 30 of the primary enclosure 26 further has a front cross member 42.

The front cross member 42 of the base 30 of the primary enclosure 26 is disposed on top of the front wall 34 of the base 30 of the primary enclosure 26, extends laterally from one side wall 32 of the base 30 of the primary enclosure 26 to the other side wall 32 of the base 30 of the primary enclosure 26, and further defines the through slot 40 of the front wall 34 of the base 30 of the primary enclosure 26.

The base 30 of the primary enclosure 26 further has a rear cross member 44.

The rear cross member 44 of the base 30 of the primary enclosure 26 is disposed on top of the rear wall 36 of the base 30 of the primary enclosure 26, and extends laterally from one side wall 32 of the base 30 of the primary enclosure 26 to the other side wall 32 of the base 30 of the primary enclosure 26.

The primary enclosure 26 further includes a cover 46.

The cover 46 of the primary enclosure 26 is a piece of sheet material 48.

The piece of sheet material 48 of the cover 46 of the primary enclosure 26 extends, in a first portion 50, upwards from one side wall 32 of the base 30 of the primary enclosure 26, then extends, in a second portion 52, transverse, and then extends, in a third portion 54, downwards to the other side wall 32 of the base 30 of the primary enclosure 26.

The first portion 50 of the piece of sheet material 48 of the cover 46 of the primary enclosure 26 is substantially straight.

The third portion 54 of the piece of sheet material 48 of the cover 46 of the primary enclosure 26 is substantially straight.

The second portion 52 of the piece of sheet material 48 of the cover 46 of the primary enclosure 26 is convexo-concave-shaped.

The piece of sheet material 48 of the cover 46 of the primary enclosure 26 forms a substantially semi-elliptical-shape in front elevational view, and has an open front 55 and an open rear 55a.

The open front 55 of the piece of sheet material 48 of the cover 46 of the primary enclosure 26 is substantially semi-elliptical-shaped, and the open rear 55a of the piece of sheet material 48 of the cover 46 of the primary enclosure 26 is substantially semi-elliptical-shaped.

The open front 55 of the piece of sheet material 48 of the cover 46 of the primary enclosure 26 and the open rear 55a of the piece of sheet material 48 of the cover 46 of the primary enclosure 26 both communicate with the through opening 38 of the base 30 of the primary enclosure 26.

The cover 46 of the primary enclosure 26 has a high point 56 and a spine 58.

The spine 58 of the cover 46 of the primary enclosure 26 extends along the high point 56 of the cover 46 of the primary enclosure 26 forming a front stop 60 and a rear stop 62.

The cover 46 of the primary enclosure 26 further has a hand carrying handle 64.

The hand carrying handle 64 of the cover 46 of the primary enclosure 26 is attached to, and extends upwardly from and along, the high point 56 of the cover 46 of the primary enclosure 26, and is for facilitating carrying the multi-function carrier 20 by a user.

The cover 46 of the primary enclosure 26 further has a pair of springy catches 66.

The pair of springy catches 66 of the cover 46 of the primary enclosure 26 are disposed along the high point 56 of the cover 46 of the primary enclosure 26, and extend past the front stop 60 of the spine 58 of the cover 46 of the primary enclosure 26 and the rear stop 62 of the spine 58 of the cover 46 of the primary enclosure 26, respectively.

The cover 46 of the primary enclosure 26 further has a chute 68.

The chute 68 of the cover 46 of the primary enclosure 26 is vertically oriented, is disposed on, and communicates through, the third portion 54 of the piece of sheet material 48 of the cover 46 of the primary enclosure 26.

The cover 46 of the primary enclosure 26 further has a pair of ramps 70.

The pair of ramps 70 of the cover 46 of the primary enclosure 26 are disposed on the first portion 50 of the piece of sheet material 48 of the cover 46 of the primary enclosure 26 and the third portion 54 of the piece of sheet material 48 of the cover 46 of the primary enclosure 26, respectively, for directing the litter 24 poured through the chute 68 of the cover 46 of the primary enclosure 26, with one ramp 70 of the cover 46 of the primary enclosure 26 communicating with the chute 68 of the cover 46 of the primary enclosure 26.

The cover 46 of the primary enclosure 26 further has a pair of doors 72.

The pair of doors 72 of the cover 46 of the primary enclosure 26 selectively close the open front 55 of the piece of sheet material 48 of the cover 46 of the primary enclosure 26 and the open rear 55a of the piece of sheet material 48 of the cover 46 of the primary enclosure 26, respectively, and when the pair of doors 72 of the cover 46 of the primary enclosure 26 close the open front 55 of the piece of sheet material 48 of the cover 46 of the primary enclosure 26 and the open rear 55a of the piece of sheet material 48 of the cover 46 of the primary enclosure 26, respectively, the pair of doors 72 of the cover 46 of the primary enclosure 26 rest on the front stop 60 of the spine 58 of the cover 46 of the primary enclosure 26 and the rear stop 62 of the spine 58 of the cover 46 of the primary enclosure 26, respectively, and are maintained thereat by engaging the pair of springy catches 66 of the cover 46 of the primary enclosure 26, respectively.

The pair of doors 72 of the cover 46 of the primary enclosure 26 have mesh portions 74 thereon for allowing the pet 22 in the multi-function carrier 20 to be able to view out therefrom.

Specific Configuration of the Waste Collection Assembly 28

The waste collection assembly 28 can best be seen in FIGS. 2-6, 7, 7A, 8, 10, 11, 12, 12A, and 13, and as such, will be discussed with reference thereto.

The waste collection assembly 28 includes a secondary enclosure 76.

The secondary enclosure 76 of the waste collection assembly 28 has a frame 78.

The frame 78 of the secondary enclosure 76 of the waste collection assembly 28 replaceably depends from the base 30 of the primary enclosure 26, and in so doing, communicates with the through opening 38 of the base 30 of the primary enclosure 26.

The frame 78 of the secondary enclosure 76 of the waste collection assembly 28 defines a chamber 79 therein, and is substantially rectangular-parallelepiped-shaped, and as such, has a pair of side walls 80, a front 82, a rear wall 84, a bottom wall 86, and a top 88.

The chamber 79 of the frame 78 of the secondary enclosure 76 of the waste collection assembly 28 communicates with the through opening 38 of the base 30 of the primary enclosure 26.

The top 88 of the frame 78 of the secondary enclosure 76 of the waste collection assembly 28 has a through opening 90 therethrough.

The through opening 90 of the top 88 of the frame 78 of the secondary enclosure 76 of the waste collection assembly 28 communicates with both the chamber 79 of the frame 78 of the secondary enclosure 76 of the waste collection assembly 28 and the through opening 38 of the base 30 of the primary enclosure 26.

The front 82 of the frame 78 of the secondary enclosure 76 of the waste collection assembly 28 has a through opening 92 therethrough.

The through opening 92 of the front 82 of the frame 78 of the secondary enclosure 76 of the waste collection assembly 28 communicates with the chamber 79 of the frame 78 of the secondary enclosure 76 of the waste collection assembly 28.

The secondary enclosure 76 of the waste collection assembly 28 further includes a receptacle 94. The receptacle 94 of the secondary enclosure 76 of the waste collection assembly 28 is for holding the litter 24.

The receptacle 94 of the secondary enclosure 76 of the waste collection assembly 28 is replaceably disposed in the chamber 79 of the frame 78 of the secondary enclosure 76 of the waste collection assembly 28, is lined with a disposable liner 95, and is accessible through the through opening 92 of the front 82 of the frame 78 of the secondary enclosure 76 of the waste collection assembly 28 so the litter 24 that is poured down the chute 68 of the cover 46 of the primary enclosure 26 travels down the ramp 70 of the cover 46 of the primary enclosure 26.

The secondary enclosure 76 of the waste collection assembly 28 further includes a door 96.

The door 96 of the secondary enclosure 76 of the waste collection assembly 28 selectively closes the through opening 92 of the front 82 of the frame 78 of the secondary enclosure 76 of the waste collection assembly 28.

The door 96 of the secondary enclosure 76 of the waste collection assembly 28 is hingedly attached, by hinges 97, to the front 82 of the frame 78 of the secondary enclosure 76 of the waste collection assembly 28, adjacent the bottom wall 86 of the frame 78 of the secondary enclosure 76 of the waste collection assembly 28.

The door 96 of the secondary enclosure 76 of the waste collection assembly 28 has a pull knob 98 that facilitates opening and closing the door 96 of the secondary enclosure 76 of the waste collection assembly 28.

The door 96 of the secondary enclosure 76 of the waste collection assembly 28 further has a magnetic latch 100.

The magnetic latch 100 of the door 96 of the secondary enclosure 76 of the waste collection assembly 28 maintains the door 96 of the secondary enclosure 76 of the waste collection assembly 28 closed.

The secondary enclosure 76 of the waste collection assembly 28 further has casters 102.

The casters 102 of the secondary enclosure 76 of the waste collection assembly 28 depend from the bottom wall 86 of the frame 78 of the secondary enclosure 76 of the waste collection assembly 28.

The waste collection assembly 28 further includes a pair of tracks 104.

The pair of tracks 104 of the waste collection assembly 28 extend from the front wall 34 of the base 30 of the primary enclosure 26 to the rear wall 36 of the base 30 of the primary enclosure 26, communicate with the through slot 40 of the front wall 34 of the base 30 of the primary enclosure 26, and are disposed below, and perpendicular to, the front cross member 42 of the base 30 of the primary enclosure 26 and the rear cross member 44 of the base 30 of the primary enclosure 26.

The waste collection assembly 28 further includes a tray 106. The tray 106 of the waste collection assembly 28 is for holding the litter 24 that has been poured down the chute 68 of the cover 46 of the primary enclosure 26, along a ramp 70 of the cover 46 of the primary enclosure 26, and onto the tray 106 of the waste collection assembly 28.

The tray 106 of the waste collection assembly 28 slides in and out of the pair of tracks 104 of the waste collection assembly 28, via the through slot 40 of the front wall 34 of the base 30 of the primary enclosure 26, and selectively closes the through opening 38 of the base 30 of the primary enclosure 26, and when the tray 106 of the waste collection assembly 28 closes the through opening 38 of the base 30 of the primary enclosure 26, the pet 22 can be carried in the multi-function carrier 20.

The tray 106 of the waste collection assembly 28 has a handle 108.

The handle 108 of the tray 106 of the waste collection assembly 28 facilitates sliding the tray 106 of the waste collection assembly 28 in and out of the pair of tracks 104 of the waste collection assembly 28.

The waste collection assembly 28 further includes a scraper blade 110.

The scraper blade 110 of the waste collection assembly 28 is resiliently attached to the front cross member 42 of the base 30 of the primary enclosure 26, depends therefrom into the through opening 38 of the base 30 of the primary enclosure 26, and scrapes along the tray 106 of the waste collection assembly 28 when the tray 106 of the waste collection assembly 28 slides in and out of the pair of tracks 104 of the waste collection assembly 28, and in so doing, the scraper blade 110 of the waste collection assembly 28 is for scraping the litter 24 that has been used from the tray 106 of the waste collection assembly 28 and thereby allow the litter 24 that has been used to drop into the receptacle 94 of the secondary enclosure 76 of the waste collection assembly 28 for disposal.

The scraper blade 110 of the waste collection assembly 28 has a pair of springs 112.

The pair of springs 112 of the scraper blade 110 of the waste collection assembly 28 resiliently attach the scraper blade 110 of the waste collection assembly 28 to the front cross member 42 of the base 30 of the primary enclosure 26.

The waste collection assembly 28 further includes a tertiary enclosure 114. The tertiary enclosure 114 of the waste collection assembly 28 is for storing pet-related items, such as, but no limited to, food and water bowls.

The tertiary enclosure 114 of the waste collection assembly 28 is replaceably attached to one side wall 80 of the frame 78 of the secondary enclosure 76 of the waste collection assembly 28 by a pair of resilient hooks 116.

The pair of resilient hooks 116 of the tertiary enclosure 114 of the waste collection assembly 28 extend outwardly from the third portion 54 of the piece of sheet material 48 of the cover 46 of the primary enclosure 26 and are replaceably received in a pair of openings 118 of the tertiary enclosure 114 of the waste collection assembly 28, respectively.

The tertiary enclosure 114 of the waste collection assembly 28 has a door 120. The door 120 of the tertiary enclosure 114 of the waste collection assembly 28 provides access therein.

Miscellaneous

As shown in FIGS. 9 and 9A, the primary enclosure 26 is replaceably attached to the waste collection assembly 28 by a latch and catch lock 122.

Impressions

It will be understood that each of the elements described above, or two or more together, may also find a useful application in other types of constructions differing from the types described above.

While the invention has been illustrated and described as embodiments of a combination pet carrier and litter box kit, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A multi-function carrier for carrying a pet and for holding litter, comprising: a) a primary enclosure; and b) a waste collection assembly; wherein said primary enclosure is for carrying the pet; wherein said waste collection assembly is operatively connected to said primary enclosure; and wherein said waste collection assembly is for holding the litter; wherein said primary enclosure includes a base; wherein said base of said primary enclosure is substantially square-shaped; wherein said base of said primary enclosure has a pair of side walls: wherein said base of said primary enclosure has a front: wherein said base of said primary enclosure has a rear wall: wherein said pair of side walls of said base of said primary enclosure, said front of said base of said primary enclosure, and said rear wall of said base of said primary enclosure define therebetween a through opening; wherein said front wall of said base of said primary enclosure has a through slot therein; wherein said through slot of said front wall of said base of said primary enclosure communicates with said through opening of said base of said primary enclosure; wherein said base of said primary enclosure has a front cross member: and wherein said front cross member of said base of said primary enclosure is disposed on top of said front of said base of said primary enclosure; wherein said front cross member of said base of said primary enclosure extends laterally from one side wall of said base of said primary enclosure to the other side wall of said base of said primary enclosure.

2. The multi-function carrier of claim 1, wherein said front cross member of said base of said primary enclosure defines said through slot of said front wall of said base of said primary enclosure.

3. The multi-function carrier of claim 2, wherein said base of said primary enclosure has a rear cross member.

4. The multi-function carrier of claim 3, wherein said rear cross member of said base of said primary enclosure is disposed on top of said rear wall of said base of said primary enclosure.

5. The multi-function carrier of claim 4, wherein said rear cross member of said base of said primary enclosure extends laterally from one side wall of said base of said primary enclosure to the other side wall of said base of said primary enclosure.

6. The multi-function carrier of claim 5, wherein said primary enclosure includes a cover.

7. The multi-function carrier of claim 6, wherein said cover of said primary enclosure is a piece of sheet material.

8. The multi-function carrier of claim 7, wherein said piece of sheet material of said cover of said primary enclosure has a first portion.

9. The multi-function carrier of claim 8, wherein said piece of sheet material of said cover of said primary enclosure has a second portion.

10. The multi-function carrier of claim 9, wherein said piece of sheet material of said cover of said primary enclosure has a third portion.

11. The multi-function carrier of claim 10, wherein said first portion of said piece of sheet material of said cover of said primary enclosure extends upwards from one side wall of said base of said primary enclosure.

12. The multi-function carrier of claim 11, wherein said second portion of said piece of sheet material of said cover of said primary enclosure extends transversely from said first portion of said piece of sheet material of said cover.

13. The multi-function carrier of claim 12, wherein said third portion of said piece of sheet material of said cover of said primary enclosure extends downwards from said second portion of said piece of sheet material of said cover of said primary enclosure to the other side wall of said base of said primary enclosure.

14. The multi-function carrier of claim 13, wherein said first portion of said piece of sheet material of said cover of said primary enclosure is substantially straight.

15. The multi-function carrier of claim 14, wherein said third portion of said piece of sheet material of said cover of said primary enclosure is substantially straight.

16. The multi-function carrier of claim 15, wherein said second portion of said piece of sheet material of said cover of said primary enclosure is convexo-concave-shaped.

17. The multi-function carrier of claim 16, wherein said piece of sheet material of said cover of said primary enclosure forms a substantially semi-elliptical-shape in front elevational view.

18. The multi-function carrier of claim 17, wherein said piece of sheet material of said cover of said primary enclosure has an open front.

19. The multi-function carrier of claim 18, wherein said piece of sheet material of said cover of said primary enclosure has an open rear.

20. The multi-function carrier of claim 19, wherein said open front of said piece of sheet material of said cover of said primary enclosure is substantially semi-elliptical-shaped.

21. The multi-function carrier of claim 20, wherein said open rear of said piece of sheet material of said cover of said primary enclosure is substantially semi-elliptical-shaped.

22. The multi-function carrier of claim 21, wherein said open front of said piece of sheet material of said cover of said primary enclosure communicates with said through opening of said base of said primary enclosure.

23. The multi-function carrier of claim 22, wherein said open rear of said piece of sheet material of said cover of said primary enclosure communicates with said through opening of said base of said primary enclosure.

24. The multi-function carrier of claim 23, wherein said cover of said primary enclosure has a high point.

25. The multi-function carrier of claim 24, wherein said cover of said primary enclosure has a spine.

26. The multi-function carrier of claim 25, wherein said spine of said cover of said primary enclosure extends along said high point of said cover of said primary enclosure.

27. The multi-function carrier of claim 26, wherein said spine of said cover of said primary enclosure forms a front stop.

28. The multi-function carrier of claim 27, wherein said spine of said cover of said primary enclosure forms a rear stop.

29. The multi-function carrier of claim 28, wherein said cover of said primary enclosure has a hand carrying handle; and wherein said hand carrying handle of said cover of said primary enclosure is for facilitating carrying said multi-function carrier by a user.

30. The multi-function carrier of claim 29, wherein said hand carrying handle of said cover of said primary enclosure is attached to said high point of said cover of said primary enclosure.

31. The multi-function carrier of claim 30, wherein said hand carrying handle of said cover of said primary enclosure extends upwardly from said high point of said cover of said primary enclosure.

32. The multi-function carrier of claim 31, wherein said hand carrying handle of said cover of said primary enclosure extends along said high point of said cover of said primary enclosure.

33. The multi-function carrier of claim 32, wherein said cover of said primary enclosure has a pair of springy catches.

34. The multi-function carrier of claim 33, wherein said pair of springy catches of said cover of said primary enclosure are disposed along said high point of said cover of said primary enclosure.

35. The multi-function carrier of claim 34, wherein one catch of said cover of said primary enclosure extends past said front stop of said spine of cover of said primary enclosure.

36. The multi-function carrier of claim 35, wherein the other catch of said cover of said primary enclosure extends past said rear stop of said spine of cover of said primary enclosure.

37. The multi-function carrier of claim 36, wherein said cover of said primary enclosure has a chute.

38. The multi-function carrier of claim 37, wherein said chute of said cover of said primary enclosure is vertically oriented.

39. The multi-function carrier of claim 38, wherein said chute of said cover of said primary enclosure is disposed on said third portion of said piece of sheet material of said cover of said primary enclosure.

40. The multi-function carrier of claim 39, wherein said chute of said cover of said primary enclosure communicates through said third portion of said piece of sheet material of said cover of said primary enclosure.

41. The multi-function carrier of claim 40, wherein said chute of said cover of said primary enclosure communicates with said through opening of said base of said primary enclosure.

42. The multi-function carrier of claim 41, wherein said cover of said primary enclosure has a pair of ramps.

43. The multi-function carrier of claim 42, wherein said pair of ramps of said cover of said primary enclosure are disposed on said first portion of said piece of sheet material of said cover of said primary enclosure and on said third portion of said piece of sheet material of said cover of said primary enclosure, respectively.

44. The multi-function carrier of claim 43, wherein said pair of ramps of said cover of said primary enclosure communicate with said through opening of said base of said primary enclosure for directing the litter poured through said chute of said cover of said primary enclosure.

45. The multi-function carrier of claim 44, wherein one ramp of said cover of said primary enclosure communicates with said chute of said cover of said primary enclosure.

46. The multi-function carrier of claim 45, wherein said cover of said primary enclosure has a pair of doors.

47. The multi-function carrier of claim 46, wherein said pair of doors of said cover of said primary enclosure selectively close said open front of said piece of sheet material of said cover of said primary enclosure and said open rear of said piece of sheet material of said cover of said primary enclosure, respectively, and when said pair of doors of said cover of said primary enclosure close said open front of said piece of sheet material of said cover of said primary enclosure and said open rear of said piece of sheet material of said cover of said primary enclosure, respectively, said pair of doors of said cover of said primary enclosure rest on said front stop of said spine of said cover of said primary enclosure and said rear stop of said spine of said cover of said primary enclosure, respectively, and are maintained thereat by engaging said pair of springy catches of said cover of said primary enclosure, respectively.

48. The multi-function carrier of claim 47, wherein said pair of doors of said cover of said primary enclosure have mesh portions thereon, respectively; and
wherein said mesh portions of said pair of doors of said cover of said primary enclosure are for allowing the pet in said multi-function carrier to be able to view out therefrom.

49. The multi-function carrier of claim 48, wherein said waste collection assembly includes a secondary enclosure.

50. The multi-function carrier of claim 49, wherein said secondary enclosure of said waste collection assembly has a frame.

51. The multi-function carrier of claim 50, wherein said frame of said secondary enclosure of said waste collection assembly replaceably depends from said base of said primary enclosure.

52. The multi-function carrier of claim 51, wherein said frame of said secondary enclosure of said waste collection assembly communicates with said through opening of said base of said primary enclosure.

53. The multi-function carrier of claim 52, wherein said frame of said secondary enclosure of said waste collection assembly defines a chamber therein.

54. The multi-function carrier of claim 53, wherein said frame of said secondary enclosure of said waste collection assembly is substantially rectangular-parallelepiped-shaped.

55. The multi-function carrier of claim 54, wherein said frame of said secondary enclosure of said waste collection assembly has a pair of side walls.

56. The multi-function carrier of claim 55, wherein said frame of said secondary enclosure of said waste collection assembly has a front.

57. The multi-function carrier of claim 56, wherein said frame of said secondary enclosure of said waste collection assembly has a rear wall.

58. The multi-function carrier of claim 57, wherein said frame of said secondary enclosure of said waste collection assembly has a bottom wall.

59. The multi-function carrier of claim 58, wherein said frame of said secondary enclosure of said waste collection assembly has a top.

60. The multi-function carrier of claim 59, wherein said chamber of said frame of said secondary enclosure of said waste collection assembly communicates with said through opening of said base of said primary enclosure.

61. The multi-function carrier of claim 60, wherein said top of said frame of said secondary enclosure of said waste collection assembly has a through opening therethrough.

62. The multi-function carrier of claim 61, wherein said through opening of said top of said frame of said secondary enclosure of said waste collection assembly communicates with said chamber of said frame of said secondary enclosure of said waste collection assembly.

63. The multi-function carrier of claim 62, wherein said through opening of said top of said frame of said secondary enclosure of said waste collection assembly communicates with said through opening of said base of said primary enclosure.

64. The multi-function carrier of claim 63, wherein said front of said frame of said secondary enclosure of said waste collection assembly has a through opening therethrough.

65. The multi-function carrier of claim 64, wherein said through opening of said front of said frame of said secondary enclosure of said waste collection assembly communicates with said chamber of said frame of said secondary enclosure of said waste collection assembly.

66. The multi-function carrier of claim 65, wherein said secondary enclosure of said waste collection assembly includes a receptacle; and
wherein said receptacle of said secondary enclosure of said waste collection assembly is for holding the litter that has been used.

67. The multi-function carrier of claim 66, wherein said receptacle of said secondary enclosure of said waste collection assembly is replaceably disposed in said chamber of said frame of said secondary enclosure of said waste collection assembly.

68. The multi-function carrier of claim 67, wherein said receptacle of said secondary enclosure of said waste collection assembly is lined with a disposable liner.

69. The multi-function carrier of claim 68, wherein said receptacle of said secondary enclosure of said waste collection assembly is accessible through said through opening of said front of said frame of said secondary enclosure of said waste collection assembly so the litter that has been used travels down into said receptacle of said secondary enclosure of said waste collection assembly.

70. The multi-function carrier of claim 69, wherein said secondary enclosure of said waste collection assembly includes a door.

71. The multi-function carrier of claim 70, wherein said door of said secondary enclosure of said waste collection assembly selectively closes said through opening of said front of said frame of said secondary enclosure of said waste collection assembly.

72. The multi-function carrier of claim 71, wherein said door of said secondary enclosure of said waste collection assembly is hingedly attached, by hinges, to said front of said frame of said secondary enclosure of said waste collection assembly.

73. The multi-function carrier of claim 72, wherein said door of said secondary enclosure of said waste collection assembly is hingedly attached to said front of said frame of said secondary enclosure of said waste collection assembly adjacent said bottom wall of said frame of said secondary enclosure of said waste collection assembly.

74. The multi-function carrier of claim 73, wherein said door of said secondary enclosure of said waste collection assembly has a pull knob.

75. The multi-function carrier of claim 74, wherein said door of said secondary enclosure of said waste collection assembly has a magnetic latch.

76. The multi-function carrier of claim 75, wherein said magnetic latch of said door of said secondary enclosure of said waste collection assembly maintains said door of said secondary enclosure of said waste collection assembly closed.

77. The multi-function carrier of claim 76, wherein said secondary enclosure of said waste collection assembly has casters.

78. The multi-function carrier of claim 77, wherein said casters of said secondary enclosure of said waste collection assembly depend from said bottom wall of said frame of said secondary enclosure of said waste collection assembly.

79. The multi-function carrier of claim 78, wherein said waste collection assembly includes a pair of tracks.

80. The multi-function carrier of claim 79, wherein said pair of tracks of said waste collection assembly extend from said front wall of said base of said primary enclosure to said rear wall 36 of said base of said primary enclosure.

81. The multi-function carrier of claim 80, wherein said pair of tracks of said waste collection assembly communicate with said through slot of said front wall of said base of said primary enclosure.

82. The multi-function carrier of claim 81, wherein said pair of tracks of said waste collection assembly are disposed below said front cross member of said base of said primary enclosure.

83. The multi-function carrier of claim 82, wherein said pair of tracks of said waste collection assembly are disposed below said rear cross member of said base of said primary enclosure.

84. The multi-function carrier of claim 83, wherein said pair of tracks of said waste collection assembly are disposed perpendicular to said front cross member of said base of said primary enclosure.

85. The multi-function carrier of claim 84, wherein said pair of tracks of said waste collection assembly are disposed perpendicular to said rear cross member of said base of said primary enclosure.

86. The multi-function carrier of claim 85, wherein said waste collection assembly includes a tray; and
wherein said tray of said waste collection assembly is for holding the litter that has been poured down said chute of said cover of the primary enclosure, along a ramp of said cover of said primary enclosure, and onto said tray of said waste collection assembly.

87. The multi-function carrier of claim 86, wherein said tray of said waste collection assembly slides in and out of said pair of tracks of said waste collection assembly.

88. The multi-function carrier of claim 87, wherein said tray of said waste collection assembly slides in and out of said pair of tracks of said waste collection assembly, via said through slot of said front wall of said base of said primary enclosure.

89. The multi-function carrier of claim 88, wherein said tray of said waste collection assembly selectively closes said through opening of said base of said primary enclosure, and when said tray of said waste collection assembly closes said through opening of said base of said primary enclosure, the pet can be carried in said multi-function carrier.

90. The multi-function carrier of claim 89, wherein said tray of said waste collection assembly has a handle.

91. The multi-function carrier of claim 90, wherein said handle of said tray of said waste collection assembly facilitates sliding said tray of said waste collection assembly in and out of said pair of tracks of said waste collection assembly.

92. The multi-function carrier of claim 91, wherein said waste collection assembly includes a scraper blade.

93. The multi-function carrier of claim 92, wherein said scraper blade of said waste collection assembly is resiliently attached to said front cross member of said base of said primary enclosure.

94. The multi-function carrier of claim 93, wherein said scraper blade of said waste collection assembly depends from said front cross member of said base of said primary enclosure.

95. The multi-function carrier of claim 94, wherein said scraper blade of said waste collection assembly scrapes along said tray of said waste collection assembly when said tray of said waste collection assembly slides in and out of said pair of tracks of said waste collection assembly, and in so doing, said scraper blade of said waste collection assembly is for scraping litter that has been used from said tray of said waste collection assembly and thereby allow the litter that has been used to drop into said receptacle of said secondary enclosure of said waste collection assembly for disposal.

96. The multi-function carrier of claim 95, wherein said scraper blade of said waste collection assembly has a pair of springs.

97. The multi-function carrier of claim 96, wherein said pair of springs of said scraper blade of said waste collection assembly resiliently attach said scraper blade of said waste collection assembly to said front cross member of said base of said primary enclosure.

98. The multi-function carrier of claim 97, wherein said waste collection assembly includes a tertiary enclosure; and
wherein said tertiary enclosure of said waste collection assembly is for storing pet-related items.

99. The multi-function carrier of claim 98, wherein said tertiary enclosure of said waste collection assembly is replaceably attached to one side wall of said frame of said secondary enclosure of said waste collection assembly.

100. The multi-function carrier of claim 99, wherein said tertiary enclosure of said waste collection assembly is replaceably attached to one side wall of said frame of said secondary enclosure of said waste collection assembly by a pair of resilient hooks.

101. The multi-function carrier of claim 100, wherein said pair of resilient hooks of said tertiary enclosure of said waste collection assembly extend outwardly from said third portion of said piece of sheet material of said cover of said primary enclosure, respectively.

102. The multi-function carrier of claim 101, wherein said pair of resilient hooks of said tertiary enclosure of said waste collection assembly are replaceably received in a pair of openings of said tertiary enclosure of said waste collection assembly, respectively.

103. The multi-Function carrier of claim 102, wherein said tertiary enclosure of said waste collection assembly has a door; and
wherein said door of said tertiary enclosure of said waste collection assembly provides access therein.

104. The multi-function carrier of claim 103, wherein said primary enclosure is replaceably attached to said waste collection assembly by a latch and catch lock.

* * * * *